United States Patent Office 2,849,278
Patented Aug. 26, 1958

2,849,278
METAL VALUE RECOVERY FROM PHOSPHATE ROCK

Charles A. Feldt, Lakeland, Fla., assignor, by mesne assignments, to the United States of America as represented by the United States Atomic Energy Commission No Drawing. Application October 3, 1952
Serial No. 313,053

15 Claims. (Cl. 23—14.5)

This invention relates to a process of producing phosphate components for use in fertilizers, animal feed supplements and phosphatic chemicals, wherein a novel process has been devised for the production of phosphatic products and for the recovery of uranium values from the raw materials processed.

In the past, various grades of so-called superphosphate and triple superphosphate have been produced. Ordinarily, a high-grade superphosphate made in a conventional manner (that is, by reacting ground phosphate rock with sulfuric acid) contains no more than about 20% by weight of available $P_2O_5$, of which about 75-80% is normally present in water-soluble condition. Similarly, the high grade triple superphosphate of commerce is produced by acidifying ground phosphate rock with orthophosphoric acid. This produces a product ordinarily containing about 47% by weight of $P_2O_5$, of which better than 95% is available and about 90% of the total available is water-soluble. The terms "water-soluble" and "available," as used herein, are used as specified and defined by the Association of Official Agricultural Chemists with reference to the phosphorus content of phosphatic components of fertilizers.

It is an object of the present invention to produce dicalcium phosphate in an efficient manner.

It is an object of the present invention to produce dicalcium phosphate and other phosphate chemical compounds substantially free of fluorine or its compounds in an efficient manner.

It is an object of the present invention to recover uranium and/or its compounds from the materials of intermediate treatment stages in the production of dicalcium phosphate.

It is an object of the present invention to recover uranium compounds relatively free of calcium compounds from the phosphorus-containing liquor processed.

Other objects of the invention will be apparent from a further understanding of the invention as more fully hereinafter described.

A raw phosphatic material comprising essentially tricalcium phosphate or its mineral equivalent (for example, collophan or apatite, of either high or low phosphatic content, and usually containing combined calcium fluoride) is allowed to react with sulfuric acid in combination with an oxidizing agent, such as nitric acid, under constant and intensive agitation for a sufficient time. The phosphatic source of material is best utilized if it is previously finely ground, i. e., 50–85% passing a 200 mesh screen. Less finely ground rock may be used, but the subsequent acidulation reaction requires a considerably longer time to achieve substantial as well as complete conversion. Sulfuric acid of any convenient dilution, for example about 51–55° Bé., is added to the ground phosphate rock in such a proportion that there will be present in the mix between about 101 and about 120% of the sulfuric acid requirement to convert all of the $P_2O_5$ present in the rock to monocalcium phosphate, allowing in addition, enough acid to also react with the impurities such as iron, alumina, fluorine, etc. The amount of acid added, which is preferably added as 60–70% sulfuric acid or any other suitable concentration, is sufficient to produce a major amount of monocalcium phosphate and a minor amount of orthophosphoric acid and dicalcium phosphate with a $CaO/P_2O_5$ mole ratio in the subsequent liquors of between about 0.5 to 1 and about 0.75 to 1.

The nitric acid, or other material having oxidizing ability under the existing reaction conditions, is added to the extent of between about 0.1 and about 5.0 pounds of nitric acid, preferably 0.4 to 1.0 pound, per 100 pounds of phosphate rock treated. For other oxidizing agents employed the number of pounds added will vary from these stated ranges in proportion to the ratio of the oxidation equivalent of these agents to the oxidation equivalent of nitric acid. The use of the oxidizing agent results in increasing the water-solubility of the uranium content of the Florida phosphate rock by insuring the presence of the uranium in the hexavalent state.

The oxidizing agent may be added in the case of solid substances, as solid material or in aqueous solution and, of course, in the case of liquid oxidizing agents, as liquids. It is preferable to add the oxidizing agents substantially simultaneously with the sulfuric acid addition or preceding the sulfuric acid addition since these expedients result in an excellent water-solubilizing of the $P_2O_5$ and uranium values. The addition of the oxidizing agent subsequent to the sulfuric acid addition is useful but less desirable from the standpoint of good recoveries of uranium. The nitric acid or other oxidizing agent is added to the phosphate rock acid mixing apparatus by means of a separate line from that employed for the sulfuric acid addition. Suitable oxidizing agents that may be employed in place of nitric acid are the hypochlorites, chlorites, chlorates, perchlorates, alkali metal nitrates, alkaline earth metal nitrates, such as hydrogen peroxide, potassium chlorate, sodium chlorate, sodium, potassium, calcium nitrates, manganese dioxide, potassium permanganate and calcium hypochlorite.

Florida phosphate rock, or other suitable phosphatic source material, is ground and/or sized at least to the point where 50% passes a 200 mesh screen. This material has admixed therewith, with agitation, the previously described quantity of sulfuric acid and nitric acid. The concentration of sulfuric acid used is very important, since it affects the percentage of phosphorus values that are recovered by the process. Florida phosphate rock is admixed with the acid-oxidizing agent combination before described and agitated for about one mintue to insure thorough mixing. The dilution of the nitric acid is such that the sulfuric dilution remains substantially unaltered from the 60 to 70% sulfuric acid dilution heretofore stated. Although it is physically possible to agitate this freshly prepared admixture for a considerable period of time, maximum recovery of phosphorus values in their water-soluble forms is attainable when the period of agitation is kept as short as possible; provided, however, that the mixing is sufficiently long and intense to afford intimate and uniform distribution of sulfuric acid and nitric acid throughout the phosphate rock mass, and further provided the acidified rock is subsequently stored. This period of agitation under these process limitations has been found to be preferably about one minute, or slightly less.

The slurry prepared using about 110% sulfuric acid acidulation, once having been thoroughly mixed, is passed onto a continuous and moving belt on which it is allowed to remain for a period of time sufficient to permit the soupy material to partially harden or set. This is usually between about twenty and about sixty minutes, but is not critical so long as the material has partially set-up and is not soupy when discharged from the belt. The speed of the belt is such as to give a depth of material sufficient to obtain a resultant set of the desired bulk density and to allow the required amount of time for the mix to partially harden before being discharged therefrom. Upon discharge from the belt, the material, having attained its initial set, is transferred to a storage pile. When handled as above described it is easily removed from the pile after storage for from five to fifteen days by means of mechanical shovels or scoops, or manually. At all times during storage, and at the time of removal from storage, the material is porous and friable. In this respect it differs widely from the set-up and cured superphosphate of commerce. The material remains in the storage pile to allow the reactions to approach equilibrium and to bring the water-soluble $P_2O_5$, in the material up to maximum, within practical limits. Generally, a two-week storage time will result in a material containing between about 94 and about 97% water-soluble $P_2O_5$, which is desirable at this point in the process, in view of subsequent process steps. The stored material is then easily pulped or slurried with an aqueous medium since it is not set into a hard mass or lumps which require disintegration by application of explosives or use of hammer mills, etc. In no case does the form or physical character of the resulting material have any effect on the subsequent process, which depends entirely on its water-soluble content. These physical steps of acid slurrying, agitation, hydration and storage are designed to increase to an optimum the total water-soluble $P_2O_5$ and $U_3O_8$ content of the material for its use as a feed to the subsequent steps. Storage of the reacted mixtures in a pile, for six or seven days or up to fifteen days, or even longer, for example up to 30 days, will also further increase the water-soluble phosphatic material; but a minimum period of fourteen days is desirable. This storage time may be shortened, to a limited extent, without sacrifice of water-solubility, if the raw phosphatic feed is more finely ground and/or sized. The highest recovery of water-soluble phosphorus values was achieved using 60 to 70% sulfuric acid. A maximum recovery of $P_2O_5$ values in the case of a mix aged thirteen days was attained using about 66.5% acid and in the case of a mix aged twenty-five days using about 69% acid.

Preferably a 10 to 15% molar excess of sulfuric acid is employed together with two pounds of nitric acid, on an anhydrous basis, per 100 pounds of rock processed in order to attain maximum conversion of the phosphorus and uranium values in the phosphatic feed material to water-soluble forms, while at the same time avoiding over-acidulating the phosphatic material, which would increase the cost without obtaining a corresponding increase in recovery of water-soluble phosphorus and/or uranium values.

A low bulk density of the rock-acid mix, while not sacrificing production and recovery of water-soluble phosphorus values, is of great importance and is one of the novel features of the instant process. The short stirring time results in a product which stores well, i. e., it does not set up in a hard form as does ordinary superphosphate, but remains soft and friable over indefinite periods of time. It thus results in easier subsequent handling and makes it possible to save considerable expense for labor and equipment charges over those required when handling stored superphosphate.

The acidified material is then agitated with previously prepared dilute leach solution to which water may have been added if no water, as such, is added during the leaching. Sufficient liquid leaching medium is added so that the resulting slurry contains between about 35 and about 40% solids as a practical matter, although more concentrated or more dilute slurries may be formed if desired. The agitation and slurrying is for a short period (usually five to fifteen minutes being ample) either while hot or under atmospheric temperatures, but preferably while hot in order to reduce viscosity and to aid in the subsequent separation of solids from liquid.

The aqueous phosphatic solution is then separated from the solids, the solids being discarded. Separation of the solids from the solution may be carried out in any convenient and conventional manner; such as, for example, by countercurrent multistage filtration or decantation (preferably at about 50–60° C.), by centrifuging (preferably countercurrent multistage centrifuging), or by use of liquid phase cyclone separators (also preferably countercurrent multistage separation). Increasing the temperature increases the capacity of the settling or separation device. However, if material is held over 60° C. for any considerable length of time, some of the water-soluble $P_2O_5$ precipitates as insoluble dicalcium phosphate. Batteries of up to three or more decantation vessels, cyclone separators, centrifuges, and repulpers, arranged in countercurrent series with solids underflow densities of 55–60% solids, are preferably used.

Sufficient solution, including water addition, is used for leaching so as to give, as a practical operation, a resulting phosphate solution having an analysis of between about 20 and about 33% dissolved solids and between about 80 and 67% water, respectively. The residue of nondissolved solids which is discarded and/or reprocessed contains only about 2.5% of the original $P_2O_5$, only about half of which is available and only about 10% of the uranium originally present. The solids residue is largely calcium sulfate. The phosphate solution after separation from the undissolved solids comprises essentially monocalcium phosphate, a small amount of orthophosphoric acid, usually with a $CaO/P_2O_5$ mole ratio of between about 0.5 to 1 and about 0.75 to 1, and various amounts of uranium, dependent upon the acidulation conditions, $P_2O_5$ solution composition and content of the original rock, usually about 0.009% $U_3O_8$ for a 20% $P_2O_5$ solution.

The aforesaid acidulation conditions, using mixtures of sulfuric acid and nitric acid, or other material capable of producing oxidizing reactions, are normally preferred. Of course, it is understood that mixtures of the oxidizing agents, capable of producing the oxidizing reactions under the reaction conditions prevailing, can also be used together with the sulfuric acid, for example, phosphate rock acidulated with sulfuric acid and a mixture of $HNO_3$ and $Ca(ClO)_2.4H_2O$ to solubilize uranium. Likewise it is to be understood that if sulfuric acid only is used there is no appreciable decrease in $P_2O_5$ solubilization, but a substantial decrease in uranium solubilization as shown in the following table.

TABLE

| Oxidizing agent | Lbs. reagent/100 lbs. rock | Percent $H_2SO_4$ acidulation | Percent of total U solubilized |
| --- | --- | --- | --- |
| None | None | 110 | 22.3 |
| $HNO_3$ | 3.1 | 100 | 64.0 |
| $HNO_3$ | 1.8 | 105 | 79.2 |
| $HNO_3$ | 3.5 | 110 | 86.5 |
| $KClO_3$ | 4.0 | 100 | 72.7 |
| $Ca(ClO)_2.4H_2O$ | 5.0 | 110 | 72.5 |
| $NaNO_3$ | 1.0 | 110 | 58.7 |
| $MnO_2$ | 2.7 | 100 | 55.1 |

The above table shows data on the relative amounts of total uranium originally present in the phosphate rock found to be water-solubilized using the amounts of oxidizing agents shown and the amount of sulfuric acid used based on the acid reactable components of the phosphate rock. The sulfuric acid was added as 63% sulfuric acid in practically all cases. The solubilized $P_2O_5$ values obtained were in the amounts expected when considering the percent acidulation stated and the number of days of aging or curing before water extracting the cured mix.

The monocalcium phosphate aqueous solution containing the dissolved uranium values is subjected to contact with an organic solvent extraction or to contact with an anion resin exchange to selectively remove the uranium values from the phosphate values. The organic solvent extractant selectively dissolves or takes up the uranium values and the anion resin selectively sorbs and holds the uranium values. These separation processes are already well known but the present process of using anion exchange resins is an improvement of the prior process. An improved process of using the organic solvent as the selective agent is more fully described and claimed in copending application Serial No. 314,946, filed October 15, 1952, now U. S. Letters Patent 2,819,145, issued January 7, 1955.

The monocalcium phosphate aqueous extract containing between about 15 and about 30%, preferably about 20%, dissolved solids is fed through two or more beds in series of an intermediate base-type anion exchange resin, for example, Permutit A-300, at the rate of 0.5 to about 2 gallons per sq. ft. per minute. The first portion of the effluent from the second or last resin bed is mostly displaced water and chloride and is discarded. The uranium because of the previous treatment is believed to be in the hexavalent state and is present as an anion uranyl-phosphate complex having the probable formula

$$UO_2(H_2PO_4)_x^-$$

As the extract solution is contacted with the resin the anion resin sorbs the uranyl complex in exchange for the chloride ion which is liberated. As the first bed of resin becomes fully sorbed with uranyl complex it is taken off stream and the second bed then becomes the bed first contacting the fresh extract solution. A new bed is placed last in the series of beds at the same time and in a stepwise series of operations moves toward becoming eventually the initial bed contacting the fresh extract solution, etc.

The saturated bed is desorbed or eluted of its uranyl complex by treatment with between about 1 and about 10% aqueous hydrochloric acid at the rate of between about 1 and about 5 gallons per sq. ft. per minute. Mixtures of aqueous hydrochloric acid and sodium chloride, or other alkali metal chloride, may be used in place of hydrochloric acid alone. The eluate is collected as three consecutive substantially equal portions (though the volume of these proportions may vary considerably depending upon the character of the resin, the raw material treated and the nature of the eluate produced). The first portion, which is quite high in $P_2O_5$ content is very low in uranyl content and is therefore combined with the effluent previously produced from the uranyl complex sorption step.

The second portion, which is rich in uranyl complex, is adjusted to a pH between about 1 and about 7, preferably between about 1.5 and about 2.5, by the use of an inorganic basic oxygen-containing calcium compound such as calcium carbonate, calcium oxide or calcium hydroxide, or the like, to precipitate some of the phosphate values therefrom. After separation of the solids from the liquid of the second portion the uranyl complex in the filtrate is subjected to the action of a reducing agent such as zinc, iron, sodium hydrosulfite or other suitable reducing agents, in order to reduce the uranium content to the quadrivalent state and the precipitate containing the uranium values is filtered from the solution. Additionally, and as a modification of the above procedure, the uranyl complex solution without a reducing step but after separation of the precipitated phosphate values may be reduced to give uranium a quadrivalent state and then precipitated using aqueous hydrofluoric acid from which the precipitate containing the uranium values is separated by any suitable solid-liquid separation step.

The third of the three consecutive eluate portions contains a small, but significant amount, of uranium values and because its hydrochloric acid concentration is as high as the first eluant, i. e., the eluting agent, this eluate portion is generally used as the initial eluant for eluting a subsequent bed of sorbed or loaded resin.

The determination of the change point for segregating one portion of eluate from the succeeding portion of eluate is largely one of determining the composition of the eluate and its changes in make-up with respect to time, while maintaining a constant rate of flow of eluant through the loaded resin bed. Thus, for example, the initial eluate is high in $P_2O_5$ values and practically free of other sorbed values. If eluant is fed at about 2 gallons per sq. ft. per minute, and the loaded resin column is about 4" in diameter and about 44" high, the first portion of eluate which is high in $P_2O_5$ values is cut off after about 25 minutes and the second portion of eluate is separately collected from that time on for an additional 25 minutes. This second portion is high in uranium values. The third portion of eluate is then separately collected for an additional 25 minutes and contains the residual eluted uranium values, as well as free hydrochloric acid. This portion is recycled as eluate in the succeeding loaded column to be eluted. The anion resin bed is simultaneously regenerated through the addition of the hydrochloric acid as the eluant and this process of regeneration is complete upon collecting the third successive portions of the eluate. The Permutit A-300 resin is eluted by using, preferably, about 4% hydrochloric acid alone, but it may also be eluted using a sodium chloride solution containing a major amount of hydrochloric acid and a minor amount of sodium chloride. The strongly basic resins, which are likewise useful in this process in place of Permutit A-300, such as Amberlite IRA-400, Dowex-1, and Permutit SE, and which is made according to the D'Alelio process of U. S. Patent No. 2,366,007, can be eluted and regenerated with about 4% sodium chloride solution containing between about 1 and about 10% of hydrochloric acid, but are best eluted with the combination of from 5 to 1 molar sodium nitrate plus 0.1 to 0.5 molar nitric acid. The A-300 and strongly basic resins are eluted also with a solution of between 25% and 50% di-ammonium acid phosphate.

In using any of the heretofore mentioned resins for selectively removing uranium values from the aqueous monocalcium phosphate extracts, it is essential that sufficient free acid, for example, hydrochloric acid or nitric acid, be retained in the resin bed prior to contact with the extract solution so that the pH (usually about 2.0) of the solution during its passage through the bed does not rise above that of the solution before treatment. Alternatively, the acid may be added to the extract solution instead of the resin, but it is preferred to add it directly to the resin bed, for example by way of the regenerative process as hereinbefore described, or to pretreat a fresh resin with acid to insure that the pH does not rise above that of the extract feed solution. Should the pH of the solution during its contact with the resin rise above its original value prior to being contacted with the resin substantial amounts of dicalcium phosphate usually will precipitate in the resin bed and clog the resin bed thus increasing the back pressure and decreasing the recovery of $P_2O_5$ values in the subsequent steps.

Another important feature of the present novel process involves the pH adjustment of the second portion or second eluate with a basic inorganic oxygen-containing compound of calcium such as calcium oxide, calcium hydroxide or calcium carbonate. In order to secure efficient recovery of uranium values from such eluates it is necessary to precipitate and separate some of the phosphate values prior to the treatment of the eluate to the action of a reducing agent to precipitate the uranium values; otherwise the uranium values are contaminated with substantial amounts of phosphate values and this would necessitate additional treatment to segregate these two values.

The Permutit A-300 resin is disclosed, as to its process of manufacture and composition, in U. S. Patent No. 2,469,683, issued to Dudley and Lundberg, and U. S. Patent No. 2,469,692, issued to Lundberg and Dudley. The Permutit SE anion exchange resin is an aminated cross-link polystyrene disclosed in U. S. Patent No. 2,366,007, issued to D'Alelio. Similarly, the other anion exchange resins which exhibit strong basic action, namely, Amberlite IRA-400 and Dowex-1, are cross-linked polystyrene reacted with various polyamines and suitable quaternary ammonium bases. Any anion exchange resin falling in the category of a strong base or an intermediate base, which is stable to monocalcium phosphate solutions and to the regenerating acids employed, is suitable for use in the removal of uranium values from the monocalcium phosphate extract solution.

The recovery of uranium from the ion exchange eluates is effected by reducing the uranyl ion to the uranous ion and precipitating as the uranous phosphate or preferably as the $UF_4$ with the addition of hydrofluoric acid (48%). The reduction and precipitation can be effected by the use of reducing agents preferably as sodium hydrosulfite or as sodium sulfoxylate formaldehyde and zinc or mixtures of zinc and sodium hydrosulfite and zinc and sodium sulfoxylate formaldehyde. The reduction and precipitation can also be accomplished electrolytically. If any ion exchange membrane is used to separate the cathode and anode compartments and the eluate is run into the cathode compartment with a neutral salt solution in the anode compartment the application of D. C. current will reduce the uranium which will precipitate as uranous phosphate. At the same time the ion exchange membrane will conduct ions (cations if the membrane is a cation exchange membrane, anions if the membrane is an anion exchange membrane) so that the resulting solution in the anode compartment will be an acid-salt solution which will be used as an eluant to elute the loaded resin column. The resulting solution in the cathode will be a neutral salt solution which after filtration of the uranous phosphate will be used in the anode compartment during the recovery of uranium from the next eluate. It has also been found that in treating the monocalcium phosphate extract solution that a considerable amount of the fluorine content thereof is removed by means of contact with the anion exchange resins so that it is possible, though not the preferred operation, to directly recover from the phosphatic effluent a monocalcium phosphate solid product or to treat with the required amount of lime or limestone to give dicalcium phosphate directly without the necessity for resorting to the separate subsequent defluorination step hereafter described.

Efficient removal of fluoride from the uranium-free solution of impure monocalcium phosphate depends upon proper conditions of time, temperature, pounds of limestone per pound of solution treated, $P_2O_5$ concentration and the mesh size of the limestone used, since it is desirable to achieve a maximum removal through precipitation of fluoride with a minimum precipitation of $P_2O_5$ value. It has been found this objective can be efficiently attained if the temperature during the fluoride removal is maintained between about 40 and about 90° C., but preferably about 60° C. and the $P_2O_5$ concentration of the solution is between about 12 and about 20%, preferably about 16%.

This aqueous solution after uranium removal is evaporated to dryness, at any convenient pressure and temperature suitable to the equipment requirements, to recover a mixture, depending upon the condition of drying, of calcium ortho or pyrophosphates and/or pyro or ortho phosphoric acid, care being taken normally that the temperature of the solution and of the resultant solids does not exceed about 200° C. The phosphate solution, after removing all water, under the above conditions of temperature, gives a solid material having the following typical distribution of constituents:

| | Percent by weight |
|---|---|
| Total $P_2O_5$ | 60.1 |
| Available $P_2O_5$ | 59.7 |
| Water-soluble $P_2O_5$ | 37.5 |
| Calcium oxide (combined) | 14.0 |

This solid material may be used as an animal phosphatic feed supplement, as a fertilizer compound, as an ingredient for compounding liquid fertilizers or as a material to make other phosphatic chemicals, and the like. Should temperatures above 200° C. be used in the drying operation and meta and/or pyrophosphatic materials be partially or completely formed, such products can be treated under autogenous pressure and temperature conditions in the presence of a small amount of water, in an autoclave, so that substantially complete conversion to orthophosphatic materials result, i. e., heating in an autoclave at about 160° C. for about 10 minutes.

Alternatively and preferably, however, the phosphatic solution is first treated normally with limestone and/or lime or other alkaline earth metal carbonates, oxides or hydroxides to precipitate the fluoride and/or silicon hexafluoride ions, present in the impure monocalcium phosphate solution, so that the resulting solution is substantially free of fluoride ions and products recovered from the treated solution are then useful as animal feed supplements or phosphate chemicals where the presence of fluorine compounds would be detrimental. Several methods have been advanced for the defluorination of solutions allied to monocalcium phosphate, such as treatment with activated carbon, hydroxyapatite, etc., but the preferred modification is the addition of alkaline earth compounds. Specifically, the monocalcium phosphate solution may be treated with substantially chemically pure calcium carbonate, calcium oxide, hydrated lime, magnesium oxide, magnesium carbonate, limestone or any other oxygen-containing basic alkaline earth metal compound, although the specific conditions for efficient removal of the fluoride ions will vary depending on the specific material used. Allochthonous limestone of the calcarenite-type has been found to efficiently decrease the fluoride concentration of the solution by precipitation of calcium fluoride and is normally preferred, commensurate with good economics for efficient plant operation.

Limestone can be added as various mesh sized material such as minus 14 mesh to plus 100 mesh or minus 200 mesh to plus 500 mesh, etc. However, finer mesh fractions usually promote a faster removal of fluoride and unless other conditions of time, temperature, etc. are modified there will be an increased loss of $P_2O_5$ in the precipitate formed. The preferred material is the particle size distribution normally found in minus 14 mesh limestone mined from Florida deposits. Under the above stated conditions, between about 2.5 and about 5.0 pounds of limestone per 100 pounds of crude monocalcium phosphate solution are intimately mixed, normally with vigorous stirring, for about 45 minutes. Preferably, however, about 3.8 pounds of limestone are added per 100 pounds of 16% $P_2O_5$ monocalcium phosphate solution. The resulting slurry of precipitated fluoride is then subjected to a solid-liquid separation and the solid discarded. The phosphatic solution, low in fluoride, is then treated to recover phosphate products low in fluoride. These products can be recovered by one of several alternate procedures as calcium, ammonium, sodium or potassium phosphate. Recovery of a low fluoride calcium phosphate can be achieved by heating and evaporating to dryness, in any convenient manner, the low fluoride monocalcium phosphate solution under conditions as heretofore described. Generally, however, this solid phosphatic material is too hygroscopic to handle, store or ship well. It takes up moisture from the atmosphere and either cakes or becomes sticky and gummy. It is usually contemplated to treat either the solid material or the phosphate solution with an oxygen-containing basic inorganic calcium compound at least to the extent that the final solid phosphatic material loses most of its hygroscopic properties and thus becomes a suitable material for storing, handling, and shipping while avoiding caking, gumminess, or stickiness.

One method of lowering the hygroscopicity characteristic and tendency of the dissolved solids of the phosphate solution is to treat the solution with a sufficient amount of ground calcium carbonate so as to materially reduce this characteristic of the final and dried material. In place of using calcium carbonate, hydrated lime, superphosphate or other suitable dried phosphatic material as well as other basic inorganic oxygen-containing calcium compounds may also be used. If about 110% of the sulfuric acid requirement of the original rock is initially employed, about 3–4% by weight of calcium carbonate (10% by weight of final dried product) is added per unit of weight of solution (which is of a concentration of about 30% solids) in order to reduce the hygroscopicity sufficiently. The amount of basic oxygen-containing calcium compound added varies, depending on the percentage of solids in the solution and the $P_2O_5$ content desired in the final product.

The resulting, partially neutralized solution may then be evaporated to dryness, in any convenient manner, as stated before, to give a final product (mixed calcium phosphates) of 55–58% $P_2O_5$. Preferably the water is driven off through the use of a direct fired rotary dryer having a large recirculating load. Increments of the partially neutralized solution are added continuously to the recirculating load to the rotary dryer. The temperature of the dryer is maintained between about 150–230° C., preferably about 175° C., with a drying time suitable to give the final product a temperature no higher than 200° C. and a moisture content of between about 1–5%. These conditions are not such as to produce other than very small amounts of calcium pyrophosphate or calcium metaphosphate. Approximately one part of solution is added to four to ten parts of dried recirculating solids. This admixture constitutes the feed to the dryer. The feed to the dryer, containing more than about 15% moisture, may result in caking difficulties in the dryer; and too high a moisture content in the feed should therefore be avoided. The product removed from the dryer is screened; that portion of it sizing between −6 and +20 mesh is removed as the final product, and the remainder is recycled as circulating load. The final product is granular, nondusting, and nonhygroscopic. It contains less than 5% moisture. The oversize material from the dryer is ground, screened and recirculated to the dryer; the undersize, as before stated, is recirculated to the dryer. At times it may be necessary also to return some of the sized product to the dryer to maintain proper moisture and drying balance between feed and product.

In a typical example, the final product analyzed about 55.9% $P_2O_5$ total, about 55.5% $P_2O_5$ available, of which about 37% was water-insoluble and the free orthophosphoric acid content was no more than about 5.4%. The calcium oxide content was about 21.1% and the fluorine content about 0.04%. The $P_2O_5$ present as metaphosphate was only 0.64%, there being practically no pyrophosphate present in the product. So far as is known, prior investigators have not been able to obtain a product of such a high available $P_2O_5$ content from the materials employed, nor have they been able to produce this desirable ratio of available and water-soluble $P_2O_5$ content so essential for high-grade fertilizer constituents.

Alternatively, the monocalcium phosphate solutions low in fluoride may be treated with oxygen-containing basic inorganic alkaline earth metal compound to precipitate calcium or other alkaline earth metal phosphates low in fluoride, although the preferred modification is the addition of limestone, hydrated lime, calcium oxide or mixtures thereof. It has been found that phosphatic values soluble in the above solution can be precipitated as water insoluble but largely citrate available $P_2O_5$ by the addition of high calcium, low magnesium oxygen-containing basic inorganic alkaline earth metal compounds, if said precipitation is carried out in accordance with the following procedure. The same may also be accomplished with the solution prior to the removal of fluoride, as heretofore described, should the fluoride concentration in the initial liquors be sufficiently low in the final product to meet the desired specifications for their ultimate use. The major difference between the treatments of the liquor is that impure monocalcium phosphate has a $CaO/P_2O_5$ mole ratio of between about 0.5 and about 0.75 while the same solution after the fluoride removal step previously described normally has a ratio of between about 0.7 and about 0.90, the former thus requiring somewhat more neutralizing agent than the latter to precipitate the phosphatic values. The actual concentration of $P_2O_5$ has not been found to be extremely critical if within the range of concentrations expected from the prior processing operations, i. e., between about 10% $P_2O_5$ and about 22% $P_2O_5$, preferably about 15% $P_2O_5$. This liquor normally is above 40° C. but less than boiling temperature and preferably the calcium phosphate is precipitated at about 55° C. When limestone is added to solutions under the above conditions sufficient amounts are used to substantially completely precipitate the phosphatic values. Accordingly, between about 10 and about 22 pounds, preferably about 16 pounds of limestone are used per 100 pounds of 16% $P_2O_5$ solution containing a $CaO/P_2O_5$ mole ratio of about 0.86. Upon agitation of the above for between about 10 minutes and about 1 hour or even longer, preferably, however, about 30 minutes, the resulting slurry containing the precipitated calcium phosphate, chiefly dicalcium phosphate, is subjected to a solid-liquid separation and the solid therefrom dried.

As a specific example of the process, the following will serve as an illustration. It is not intended that the scope of the invention be limited thereto.

*Example*

Florida phosphate rock of about 68.6 BPL and containing about 0.01% uranium was ground to about 52.6% passing a 200 mesh screen. At the continuous rate of about 2.0 tons per hour this rock was fed to a paddle mixer with the simultaneous addition to the mixer of 51.44° Bé. at 60° F. aqueous sulfuric acid at about 115° F. to the extent of about 110% acidulation at the rate of about 1.94 tons per hour of the gravity used and at the same time there was added to the mixing chamber the equivalent of about 3 pounds of 100% nitric acid per 100 pounds of rock used added at the equivalent rate of about 120 pounds of 100% nitric acid per hour. The nitric acid was actually added at the rate of about 4 pounds of 1.44 specific gravity (74.5% $HNO_3$) acid per 100 pounds of rock used or about 161 pounds of this gravity of nitric acid per hour. The mixer paddles were rotating at about 120 revolutions per minute and the mixing retention time averaged about 1 minute. The soupy mix was continuously discharged onto a continuously moving belt where it remained for about 1 hour thus allowing sufficient time for the soupy mix to partially set-up and partially harden. After about 1 hour on the belt the set-up mix was discharged into a storage pile or bin where it was allowed to stand undisturbed for at least about 30 days, though in some instances such piles have stood for as long as 45 to 60 days without deleterious effects so far as the ultimate recovery of $P_2O_5$ and $U_3O_8$ values are concerned.

The friable, cured, acidulated rock mix, after standing about 30 days, was subjected to a continuous countercurrent, four-stage leaching operation with water. The water was added in the proportion of about 0.88 pound of water per pound of aged acidulated rock mix dry basis used. The rate of addition of the aged acidulated rock mix to the countercurrent extraction was about 18 pounds per minute and the water about two gallons per minute. The finished monocalcium phosphate leach solution was produced at the rate of about 1.1 gallons per minute. It had a gravity of about 30.2° Bé. at 108° F. and had the following analysis:

| Ingredient: | Percent by weight |
|---|---|
| $P_2O_5$ | 19.37 |
| F | .20 |
| $SO_4$ | 1.07 |
| $NO_3$ | 1.05 |
| CaO | 4.73 |
| U | 0.0108 |

The filter cake, after leaching with fresh water and filtering, contained about 5.8% $P_2O_5$.

About 15 gallons of the monocalcium phosphate extract solution produced as above described was passed through a 4" column containing ⅓ cu. ft. of A–300 anion exchange resin previously described as −20+50 mesh and at a flow rate of ⅒ gallon per minute. The first gallon of effluent, primarily water, taken over a 10 minute period is discarded. The next 14 gallons collected over a 140 minute period is sent for further processing to recover the $P_2O_5$ values contained herein. At this point the effluent from the column is sent to a second column for 150 minutes at the same flow rate at which time the column is removed from the sorption cycle and the uranium removed by elution with 1 molar hydrochloric acid (about 4%). 15 gallons of 1 molar hydrochloric acid is passed down flow through the column at the rate of .2 gallon per minute. The first 5 gallons of eluate collected over a 25 minute period is combined with the previously collected effluent for $P_2O_5$ recovery. The second portion of the eluate collected during the next 25 minutes is saved for $U_3O_8$ precipitation; the third portion of eluate collected during the next 25 minute period is recycled as eluate in the succeeding loaded column to be eluted. To the 5 gallons of eluate collected as the second portion is added about 1.6 lbs. of sodium hydroxide and the resulting phosphate precipitate filtered from the slurry. The filtrate is then reduced by the addition of about 0.55 lb. of sodium hydrosulfite while stirring over a period of about 1 hour. The uranous phosphate precipitate is filtered off, washed and dried. In the original 15 gallons of mono-calcium phosphate extract solution employed there was about 5.7 grams of uranium. The uranous phosphate cake contained about 4 grams of uranium.

The phosphatic effluent obtained from the initial contacting of the extract with resin is then treated with the required amount of limestone to substantially completely precipitate the fluorine remaining therein, as calcium fluoride. This slurry is filtered after about 30 minutes and the fluoride-free and uranium-free monocalcium phosphate solution is subjected to the recovery procedures previously described to isolate a solid product comprising essentially monocalcium phosphate or dicalcium phosphate or a mixture of these two compounds.

Although this example discloses the use of an oxidizing agent in conjunction with the sulfuric acid acidulation of the phosphate rock and although this results in insuring the presence of the uranium in the hexavalent state, the acidulation with sulfuric acid without the presence of an added oxidizing agent is distinctly within the purview of this invention and the uranium values are equally as well sorbed on and eluted from the resin in the event that no added oxidizing agent is employed during the phosphate rock acidulation step.

Having thus fully described and illustrated the character of the invention what is desired to be secured by Letters Patent is:

1. A process for the recovery of uranium values from phosphate rock which comprises acidulating said phosphate rock with aqueous sulfuric acid of between about 60 and 70% strength in molar excess up to about 20% over that required to form monocalcium phosphate and to react with the reactable impurities present in the rock while agitating the admixture during the acidulating, aging the admixture for about 14 days, admixing a liquor selected from the group consisting of water and an aqueous unsaturated monocalcium phosphate solution with the aged acidified phosphate material, slurrying the same, separating undissolved solids from the phosphate liquor, contacting the phosphate liquor with basic anion exchange resin, operating on the chloride cycle, to sorb the uranium values, eluting the loaded resin with dilute aqueous hydrochloric acid and precipitating the uranium values from the phosphate-uranium containing eluate.

2. A process as in claim 1 wherein the uranium values are recovered from the eluate by adjusting the pH of the solution to between about 1 and 7, separating the phosphate precipitate from the liquor, subjecting the solids-free liquid to the action of a reducing agent and recovering the precipitated uranium values from the treated solution.

3. A process as in claim 2 wherein the pH of the solution is adjusted to about 2.

4. A process as in claim 2 wherein the pH of the solution is adjusted to about 2 and the reducing agent employed is sodium hydrosulfite.

5. A process for the recovery of uranium values from Florida phosphate rock which comprises acidulating said rock in comminuted condition such that at least 50% passes a 200 mesh screen with aqueous sulfuric acid of between about 60 and about 70% strength, said acidulated rock mixture containing at least one added reagent capable of acting as an oxidizing agent for conversion of tetravalent uranium to hexavalent uranium under the prevailing reaction conditions, said sulfuric acid being used to the extent of between about 101 and about 120% acidulation of the constituents of the rock capable of reacting with the sulfuric acid and to form monocalcium phosphate, agitating the mixture during the acidulation, aging the reacted mixture for between about 14 and about 30 days, admixing a liquid selected from the group consisting of water and an unsaturated aqueous monocalcium phosphate solution with the aged acidified phosphatic material, slurrying the same, separating undissolved solids from the phosphatic liquid, contacting the phosphatic liquid with a basic anion exchange resin, operating on the chloride cycle, to sorb the uranium values, eluting the loaded resin with dilute aqueous hydrochloric acid and recovering the uranium values from the eluate.

6. A process as in claim 5 wherein the eluate is collected in three consecutive portions, the first portion being combined with the phosphatic effluent, the third portion being reused as eluate and the second portion being adjusted to a pH of between about 1 and about 7, separating the phosphate precipitate from the resultant pH adjusted liquid, subjecting the solids-free liquid to the action of a reducing agent capable of conversion of hexavalent uranium to tetravalent uranium and recovering the precipitated uranium values from the treated solution.

7. A process as in claim 6 wherein the pH of the solution is adjusted to about 2.

8. A process as in claim 6 wherein the pH of the solution is adjusted to about 2 and the reducing agent is sodium hydrosulfite.

9. A process as in claim 6 wherein the eluant is about 4% aqueous hydrochloric acid.

10. A process as in claim 5 wherein the resin is an aminated cross-linked polystyrene.

11. A process as in claim 6 wherein the resin employed is an aminated cross-linked polystyrene.

12. A process as in claim 6 wherein the pH of the solution is adjusted to about 2, the resin employed is an aminated cross-linked polystyrene, and the eluant is about 4% aqueous hydrochloric acid.

13. A process as in claim 6 wherein the pH of the solution is adjusted to about 2, the resin employed is an aminated cross-linked polystyrene, and the reducing agent is sodium hydrosulfite.

14. A process as in claim 6 wherein the resin has been treated with acid to give a pH lower than that of the solution to be contacted whereby phosphate precipitation in the resin bed is prevented.

15. The process of treating aqueous acidic phosphatic solution containing dissolved uranium values predominantly in the tetravalent state which comprises contacting said phosphatic solution with basic anion exchange resin operating on a chloride cycle, to sorb the uranium values, successively eluting the loading resin with dilute aqueous mineral acid to remove a predominantly phosphate solution eluate as an initial portion, further eluting the resin with said acid to produce a second eluate portion containing phosphate and uranium values and precipitating the uranium values from said second eluate portion.

References Cited in the file of this patent

UNITED STATES PATENTS

| | | |
|---|---|---|
| 2,013,970 | Moore | Sept. 10, 1935 |
| 2,770,520 | Long et al. | Nov. 13, 1956 |
| 2,795,480 | Stephan et al. | June 11, 1957 |

FOREIGN PATENTS

| | | |
|---|---|---|
| 437,833 | Great Britain | Nov. 6, 1935 |
| 626,882 | Great Britain | July 22, 1949 |

OTHER REFERENCES

Fritsch: The Manufacture of Chemical Manures, pp. 68, 73–83 and 137 (1911); publ. by Scott, Greenwood & Sons, London.

Guntz: Comptes Rendus, vol. 234, pp. 868–870, Feb. 18, 1952.

UNITED STATES PATENT OFFICE
CERTIFICATE OF CORRECTION

Patent No. 2,849,278                                                            August 26, 1958

Charles A. Feldt

It is hereby certified that error appears in the printed specification of the above numbered patent requiring correction and that the said Letters Patent should read as corrected below.

Column 12, line 5, after "acidulating" insert -- to form an admixture containing a substantial portion of the uranium present in the hexavalent form --; lines 14 and 15, strike out "and precipitating the uranium values from the phosphate-uranium containing eluate" and insert instead -- , treating the uranium eluate with an inorganic basic oxygen-containing calcium compound to precipitate phosphate from the eluate and recovering the uranium values from the solids-free eluate --; line 20, after "agent" insert -- to reduce the uranium to the tetravalent state --; line 21, strike out "precipitated"; same column 12, line 49, after "acid" insert -- , treating the uranium eluate with an inorganic basic oxygen-containing calcium compound to precipitate phosphate from the eluate --; line 50, before "eluate" insert -- solids-free --; line 54, strike out "eluate" and insert instead -- eluant --; lines 59 and 60, strike out "precipitated"; column 13, line 11, strike out "tetravalent" and insert instead -- hexavalent --; line 18, after "values" insert -- , treating the uranium eluate with an inorganic basic oxygen-containing calcium compound to precipitate phosphate from the eluate --; column 14, line 2, before "portion" insert -- solids-free --.

Signed and sealed this 3rd day of February 1959.

(SEAL)
Attest:

KARL H. AXLINE
Attesting Officer

ROBERT C. WATSON
                                                                        Commissioner of Patents